(12) United States Patent
Marupaduga et al.

(10) Patent No.: US 10,411,781 B1
(45) Date of Patent: *Sep. 10, 2019

(54) DYNAMICALLY ADJUSTING VERTICAL BEAMFORMING WEIGHTS

(71) Applicant: Sprint Communications Company L.P., Overland Park, KS (US)

(72) Inventors: Sreekar Marupaduga, Overland Park, KS (US); Andrew M. Wurtenberger, Olathe, KS (US)

(73) Assignee: Sprint Communications Company, L.P., Overland Park, KS (US)

(*) Notice: Subject to any disclaimer, the term of this patent is extended or adjusted under 35 U.S.C. 154(b) by 0 days.

This patent is subject to a terminal disclaimer.

(21) Appl. No.: 16/153,391

(22) Filed: Oct. 5, 2018

Related U.S. Application Data

(63) Continuation of application No. 15/477,398, filed on Apr. 3, 2017, now Pat. No. 10,116,373.

(51) Int. Cl.
| | |
|---|---|
| *H04B 7/06* | (2006.01) |
| *H04B 17/24* | (2015.01) |
| *H04B 17/336* | (2015.01) |
| *H04L 12/26* | (2006.01) |
| *H04W 88/08* | (2009.01) |
| *H04W 88/02* | (2009.01) |

(52) U.S. Cl.
CPC ......... *H04B 7/0632* (2013.01); *H04B 7/0617* (2013.01); *H04B 17/24* (2015.01); *H04B 17/336* (2015.01); *H04L 43/16* (2013.01); *H04W 88/02* (2013.01); *H04W 88/08* (2013.01)

(58) Field of Classification Search
CPC .... H04B 7/0632; H04B 17/24; H04B 17/336; H04B 7/0617; H04L 43/16; H04W 88/08; H04W 88/02
See application file for complete search history.

(56) References Cited

U.S. PATENT DOCUMENTS

| | | | |
|---|---|---|---|
| 9,801,026 B2 | 10/2017 | Birkenes et al. | |
| 2004/0072570 A1* | 4/2004 | Smith ................ | H04B 7/2041 455/446 |
| 2008/0268797 A1* | 10/2008 | Ahn ....................... | H01Q 3/30 455/127.1 |
| 2009/0023447 A1* | 1/2009 | Hagerman ........ | H04W 36/0083 455/436 |
| 2013/0002488 A1 | 1/2013 | Wang et al. | |
| 2014/0140424 A1 | 5/2014 | Clevorn | |
| 2014/0334327 A1 | 11/2014 | Wang et al. | |
| 2017/0041811 A1 | 2/2017 | Qiao et al. | |
| 2017/0126379 A1 | 5/2017 | Choi et al. | |

* cited by examiner

*Primary Examiner* — Janice N Tieu

(57) ABSTRACT

Methods and systems are provided for dynamically adjusting vertical beamforming weights to influence a width of a vertical beam emitted from an antenna. A quantity of users present in a particular geographic area is determined, where the user devices have a line of sight with the antenna and are vertically distributed from other user devices. CQIs are received from the user devices. It is determined that the quantity of user devices is above a maximum threshold of user devices, and the CQIs indicated that channel quality is below a minimum threshold. The amplitude and phase components of the vertical beamforming weight are adjusted to modify the width of the vertical beam emitted from the antenna.

20 Claims, 4 Drawing Sheets

DYNAMICALLY ADJUSTING VERTICAL BEAMFORMING WEIGHTS

CROSS-REFERENCE TO RELATED APPLICATIONS

This application is a continuation of U.S. application Ser. No. 15/477,398 filed Apr. 3, 2017, entitled "Dynamically Adjusting Vertical Beamforming Weights," which is incorporated herein by reference in its entirety.

SUMMARY

The present disclosure is directed, in part, to dynamically adjusting vertical beamforming weights to influence a vertical beam width of an antenna, substantially as shown in and/or described in connection with at least one of the figures, and as set forth more completely in the claims.

In aspects set forth herein, vertical beamforming weights are adjusted, such as the amplitude and/or phase components, to modify the vertical beam width of a beam emitted from an antenna. While, typically, a horizontal beam width may be adjusted by adjusting the horizontal beamforming weight, aspects herein enable the vertical beam width to be adjusted. An antenna located nearby to a tall building or other vertical structure, for example, may not have the capability to provide a high quality of service to user device located near or at the top of that structure if the vertical beam width cannot be adjusted. The beam emitted from the antenna, for instance, may not provide quality coverage to that user device. However, here, the vertical beam width can be dynamically adjusted based on different parameters received at the cell site, including the channel quality indicator received from the user devices and the number of users having a line of sight to the cell site.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
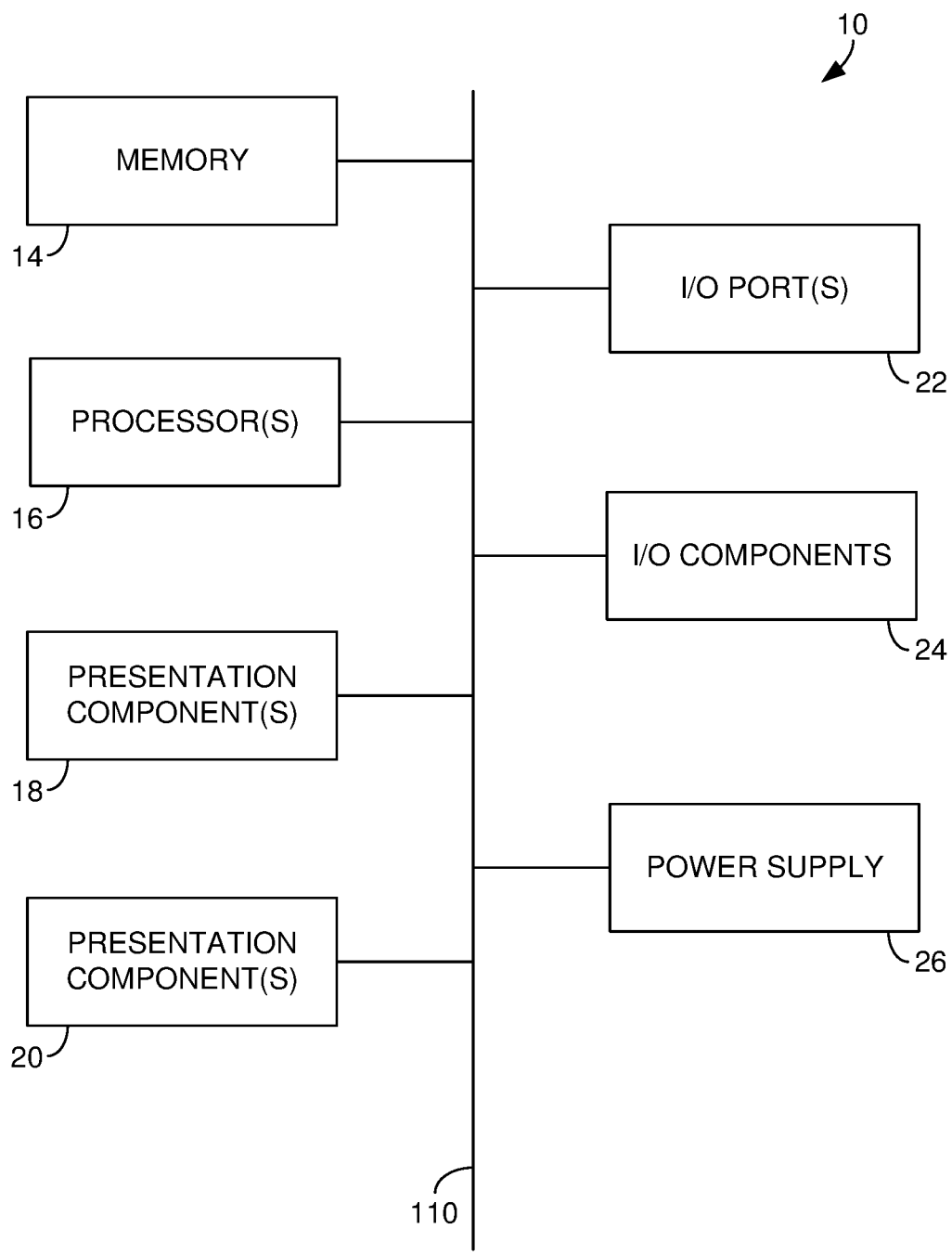
FIG. 1 depicts a diagram of an exemplary computing environment suitable for use in implementations of the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

In certain aspects, methods are provided for dynamically changing the vertical beamforming weight of a vertical beam to alter the width of the vertical beam based on various factors. For instance, depending on the number of in-building users and the throughput, which may be indicated by CQI, one or more of the amplitude or phase may be adjusted to modify the width of the emitted beam.

In one embodiment, if the number of users (e.g., in line of sight) is above a predetermined threshold, which may be set by the network operator, and the CQIs received from the user devices is low (e.g., below a minimum threshold), the base station (e.g., eNodeB) may increase the amplitude and change the phase. In embodiments, a low CQI is from 1 to 6, or from 1 to 5, or from 1 to 4, or from 1 to 3, or any other range set by the network. Generally, a low CQI indicates a low efficiency of the network performance, including poor RF conditions, low throughput, low SINR, or the like.

In another embodiment, if the number of users on different floors of a building is above a threshold and the CQI is moderate, the base station may change the phase only, and not modify the amplitude at that time. A moderate CQI, as used herein, refers to a CQI that is above a minimum threshold but below a maximum threshold. For instance, a moderate CQI may be from 5 to 9, or from 6 to 9, or from 7 to 9, or any other range as set by the network. In some embodiments, a high CQI is 10 to 15. A high CQI indicates a better SINR, throughput, and SINR when compared to those parameters when there is a low CQI. Even more, a higher CQI indicates a higher coding rate, or how many bits the network is sending per second.

Being able to provide a system for dynamically modifying beamforming weights for a vertical beam emitted from an antenna provides a variety of technical benefits, including benefits for the user. For example, more network efficiencies are realized when the beam emitted from an antenna is capturing the most users, and on the flip side, those users are provided with a better overall experience.

As used herein, user devices that are vertically separated or vertically distributed from other user devices are ones that are located higher or lower than the others. For example, a user device that is located on the $20^{th}$ floor of a building is vertically separated from a user device that is on the first floor of that building. Similarly, a user device that is on the $10^{th}$ floor of a building is vertically separated from a user device on the second floor. The degree of separation could be small or large, as user devices that are just one floor away from one another would still be considered to be vertically separated.

In a first aspect, one or more computer-readable media having computer-executable instructions embodied thereon are provided that, when executed, perform a method for dynamically adjusting vertical beamforming weights to influence a width of a beam emitted from an antenna. The method comprises determining a quantity of user devices present in a particular geographic area. At least a portion of the user devices are vertically distributed from others of the user devices. The method further comprises receiving channel quality indicators (CQIs) from one or more of the user devices and determining that the quantity of the user devices is above a maximum threshold of user devices, and the CQIs indicate that channel quality is below a minimum threshold. Further, the method comprises adjusting amplitude and phase components of a vertical beamforming weight to adjust the width of the vertical beam emitted from the antenna.

In another aspect, a method is provided for dynamically adjusting vertical beamforming weights to influence a vertical beam width of an antenna. The method comprises determining a quantity of user devices present in a particular geographic area. At least a portion of the user devices are vertically distributed from others of the user devices. The method also comprises receiving channel quality indicators (CQIs) from one or more of the user devices and determining that the quantity of the user devices is above a maximum threshold of user devices, and the CQIs indicate that channel quality is above a minimum threshold and below a maximum threshold. Additionally, the method comprises adjusting a phase portion of a vertical beamforming weight to adjust the vertical beam width of the antenna.

In yet another aspect, a dynamic vertical beamforming system is provided for dynamically adjusting vertical beamforming weights to influence a vertical beam width of an antenna. The dynamic vertical beamforming system comprises a processor and one or more computer storage hardware devices storing computer-usable instructions that, when used by the processor, cause the processor to determine that a quantity of user devices having a line of sight to the antenna is above a threshold of user devices, where at least a portion of the user devices being vertically separated from others of the user devices. Further, the processor determines, based on information sent from the user devices, current radio frequency (RF) conditions between the antenna and the user devices. If the current RF conditions are below a minimum threshold, the phase and amplitude portions of the vertical beamforming weight are adjusted. If the current RF conditions are above the minimum threshold and below a maximum threshold, the phase portion of the vertical beamforming weight is adjusted, but the amplitude portion of the vertical beamforming weight is not adjusted.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention.

Further, various technical terms are used throughout this description. An illustrative resource that fleshes out various aspects of these terms can be found in Newton's Telecom Dictionary, 25th Edition (2009).

Embodiments of our technology may be embodied as, among other things, a method, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Referring to FIG. 1, a diagram is depicted of an exemplary computing environment suitable for use in implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

Radio 116 represents a radio that facilitates communication with a wireless telecommunications network. Illustrative wireless telecommunications technologies include CDMA, GPRS, TDMA, GSM, and the like. Radio 116 might additionally or alternatively facilitate other types of wireless communications including Wi-Fi, WiMAX, LTE, or other VoIP communications. As can be appreciated, in various embodiments, radio 116 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2:
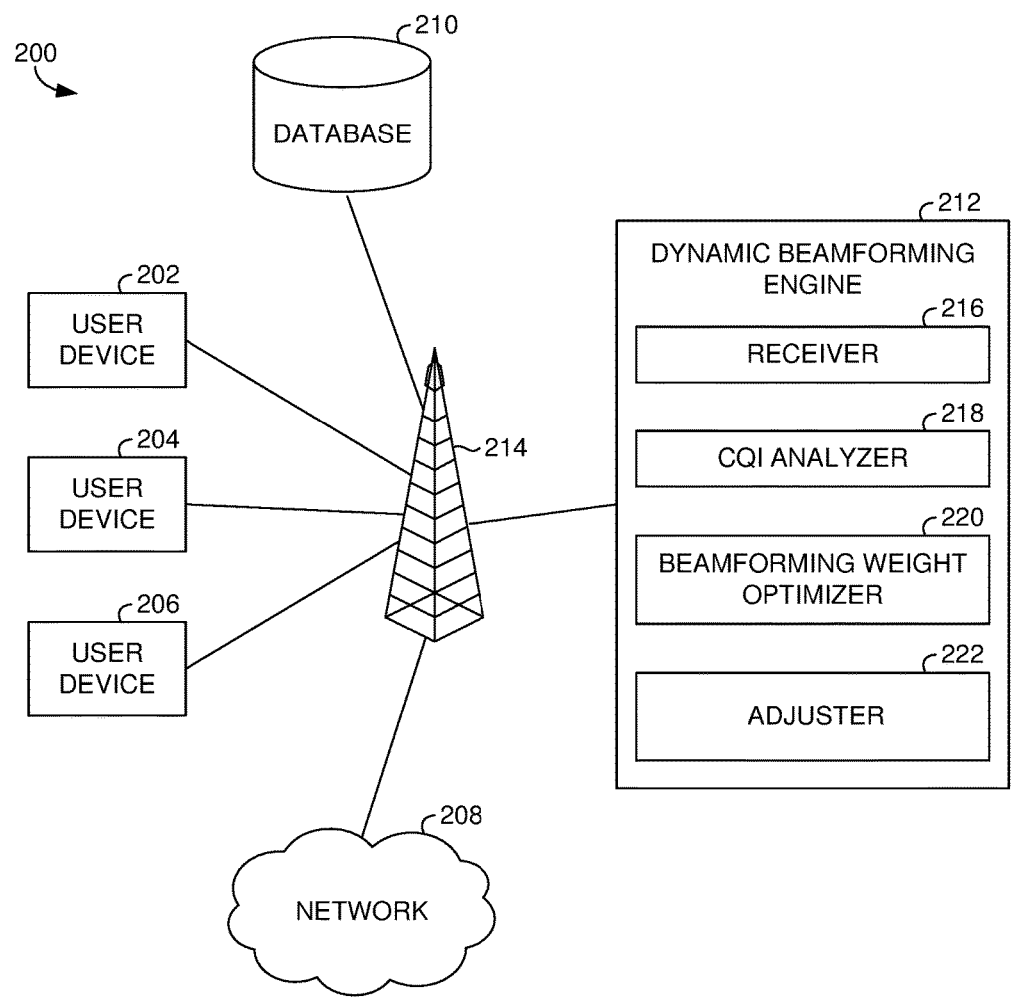
FIG. 2 illustrates a diagram of an exemplary network environment in which implementations of the present disclosure may be employed.

FIG. 2 provides an exemplary network environment in which implementations of the present disclosure may be employed. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

Network environment 200 includes user devices (items 202, 204, and 206), cell site 214, network 208, database 210, and dynamic beamforming engine 212. In network environment 200, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, an access point, and any combination of these delineated devices.

In some aspects, the user devices (items 202, 204, and 206) can correspond to computing device 100 in FIG. 1. Thus, a user device can include, for example, a display(s), a power source(s) (e.g., a battery), a data store(s), a speaker(s), memory, a buffer(s), a radio(s) and the like. In some implementations, a user device (items 202, 204, and 206) comprises a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some cases, the user devices (items 202, 204, and 206) in network environment 200 can optionally utilize network 208 to communicate with other computing devices (e.g., a mobile device(s), a server(s), a personal computer(s), etc.) through cell site 214. The network 208 may be a telecommunications network(s), or a portion thereof. A telecommunications network might include an array of devices or components (e.g., one or more base stations), some of which are not shown. Those devices or components may form network environments similar to what is shown in FIG. 2, and may also perform methods in accordance with the present disclosure. Components such as terminals, links, and nodes (as well as other components) can provide connectivity in various implementations. Network 208 can include multiple networks, as well as being a network of networks, but is shown in more simple form so as to not obscure other aspects of the present disclosure.

Network 208 can be part of a telecommunication network that connects subscribers to their immediate service provider. In some instances, network 208 can be associated with a telecommunications provider that provides services (e.g., LTE) to user devices, such as user devices 202, 204, and 206.

For example, network 208 may provide voice services to user devices or corresponding users that are registered or subscribed to utilize the services provided by a telecommunications provider. Network 208 can comprise any communication network providing voice and/or data service(s), such as, for example, a 1× circuit voice, a 3G network (e.g., CDMA, CDMA2000, WCDMA, GSM, UMTS), a 4G network (WiMAX, LTE, HSDPA), or a 5G network.

In some implementations, cell site 214 is configured to communicate with user devices, such as user devices 202, 204, and 206 that are located within the geographical area, or cell, covered by radio antennas of cell site 214. Cell site 214 may include one or more base stations, base transmitter stations, radios, antennas, transmitters/receivers, digital signal processors, control electronics, GPS equipment, and the like. In particular, cell site 214 may selectively communicate with the user devices using beamforming. When structures that may have users with user devices vertically separated from one another (e.g., office building, sky rise, building with two or more floors), beamforming may not be able to capture most or all of the user devices in the structure, as adjusting the beamforming weight for horizontal beamforming would not allow the beam to vertically change.

As shown, cell site 214 is in communication with dynamic beamforming engine 212, which comprises various components that are utilized, in various implementations, to perform one or more methods for dynamically adjusting vertical beamforming weights to influence a width of a vertical beam emitted from an antenna in one or more wireless communications networks. In some implementations, dynamic beamforming engine 212 comprises components including a receiver 216, a CQI analyzer 218, a beamforming weight optimizer 220, and an adjuster 222. However, in other implementations, more or less components than those shown in FIG. 2 may be utilized to carry out aspects of the invention described herein.

The receiver 216 of the dynamic beamforming engine 212 is generally responsible for receiving channel quality indicators (CQIs) from various user devices, such as user devices 202, 204, and 206, that are within the coverage area of cell site 214. CQI is an indicator sent from a user device to the cell site 214, and in particular the base station (e.g., eNodeB) that includes information on how good or bad the communication channel quality is. It may indicate a suitable downlink transmission data rate, and is typically a 4-bit integer based on the observed signal-to-interference-plus-noise ratio (SINR) at the user device. The CQI typically takes into account the user device capability, such as the number of antennas and the type of receiver used for detection.

The CQI analyzer 218 is generally responsible for determining whether the CQIs received by the receiver 216 are above or below a minimum threshold value, and similarly, whether the CQIs are above or below a maximum threshold value. As will be discussed herein, CQI values received from user devices (items 202, 204, and 206) are used to determine beamforming weights to optimize the vertical beam width. In embodiments, the portion of the beamforming weight that is modified to cause the width of the beamform to increase or decrease is dependent upon the received CQI values. In embodiments, when multiple CQIs are received from multiple user devices, the CQI analyzer 218 may use an average, mean, median, or any other method to determine a single CQI value that is used to determine a beamforming weight. In other embodiments, a received CQI value that is outside of an expected range, such as one that is below the minimum threshold, may be used to determine a vertical beamforming weight to dynamically change the beam width.

The beamforming weight optimizer 220 is generally responsible for determining a beamforming weight based on the received QCI values and the number of users. For example, the beamforming weight optimizer 220 may access database 210, which may have stored a table of, at least, beamforming weights for various CQI values. The beamforming weights may comprise, at least, an amplitude and a phase, either or both of which could be modified, depending on the CQI values and other factors. For instance, in one embodiment, if the CQI value(s) is below a minimum threshold, thereby indicating that channel quality is too low, both amplitude and phase of a vertical beamforming weight may be adjusted to adjust the vertical beam width of the antenna. However, in another embodiment, if the CQI value(s) is above a minimum threshold but below a maximum threshold, the phase component of the vertical beamforming weight may be adjusted, but the amplitude may not be adjusted, and may be kept at the same value.

The adjuster 222 is generally responsible for adjusting the amplitude and/or phase components of the vertical beamforming weight to adjust the width of the vertical beam emitted from the antenna. In cases where the CQI value(s) is low, the amplitude and phase components may both be adjusted to cause the width of the vertical beam to increase, thus potentially capturing more user devices within the vertical beam.

Figure 3:
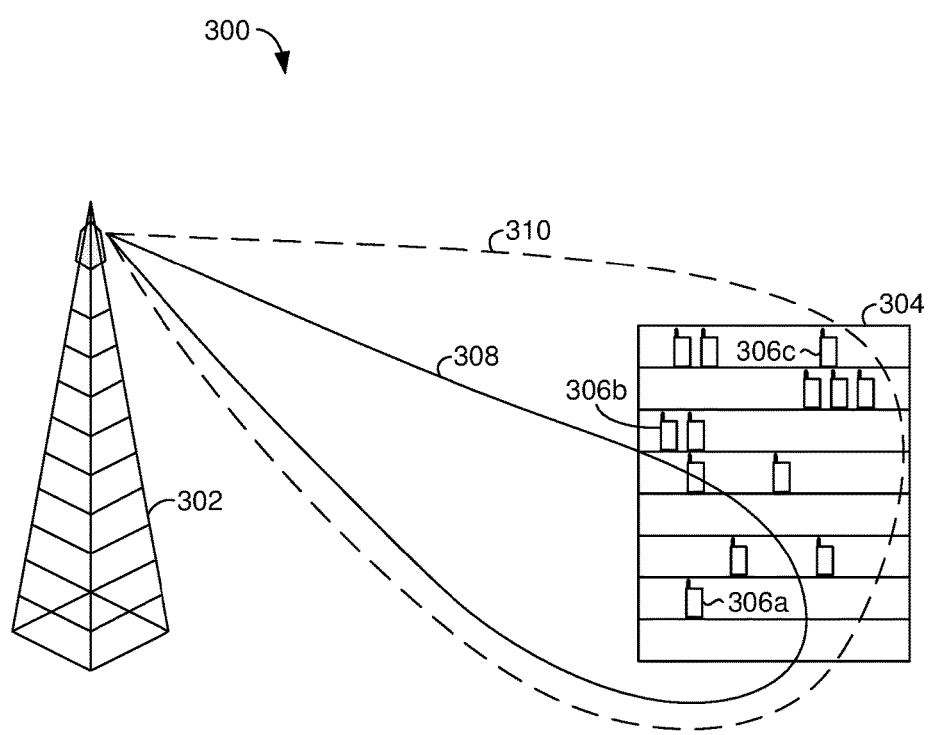
FIG. 3 depicts a diagram of two beams emitted from an antenna, each beam having differing vertical beamforming weights, in accordance with implementations of the present disclosure.

Turning now to FIG. 3, a diagram 300 is depicted of a beam 308 whose vertical beamforming weight is modified to cause the width of the beam to change, in accordance with aspects herein. In FIG. 3, cell site 302 may include one or more antennas, base stations, BTSs, radios, etc. In embodiments, the antennas are capable of using beamforming as their signal processing technique. Beam 308, in one embodiment, is a first beam that is directed toward structure 304. Structure 304 comprises many user devices, as shown, including user devices 306*a*, 306*b*, and 306*c*. The first beam 308 provides coverage for user device 306*a*, but not for 306*b* or 306*c*. As shown, user device 306*a* is located at a first vertical location, while user devices 306*b* and 306*c* are located vertically higher than user device 306*a*. While horizontal beamforming techniques may not be able to capture user devices 306*b* and 306*c* by changing the beamforming weight used by antennas in the cell site 302, vertical beamforming techniques can. As shown, when one or more of an amplitude or a phase of the vertical beamforming weight of beam 308 is modified to increase the width of beam 308, user devices that are vertically separated (e.g., lower, higher) may receive coverage from cell site 302 when otherwise may not be able to. As such, a dynamic modification of vertical beamforming weights allow a single cell site, such as cell site 302, to provide better coverage for user devices that are at different vertical locations within a structure or even different structures, and that are on different floors, for example.

Figure 4:
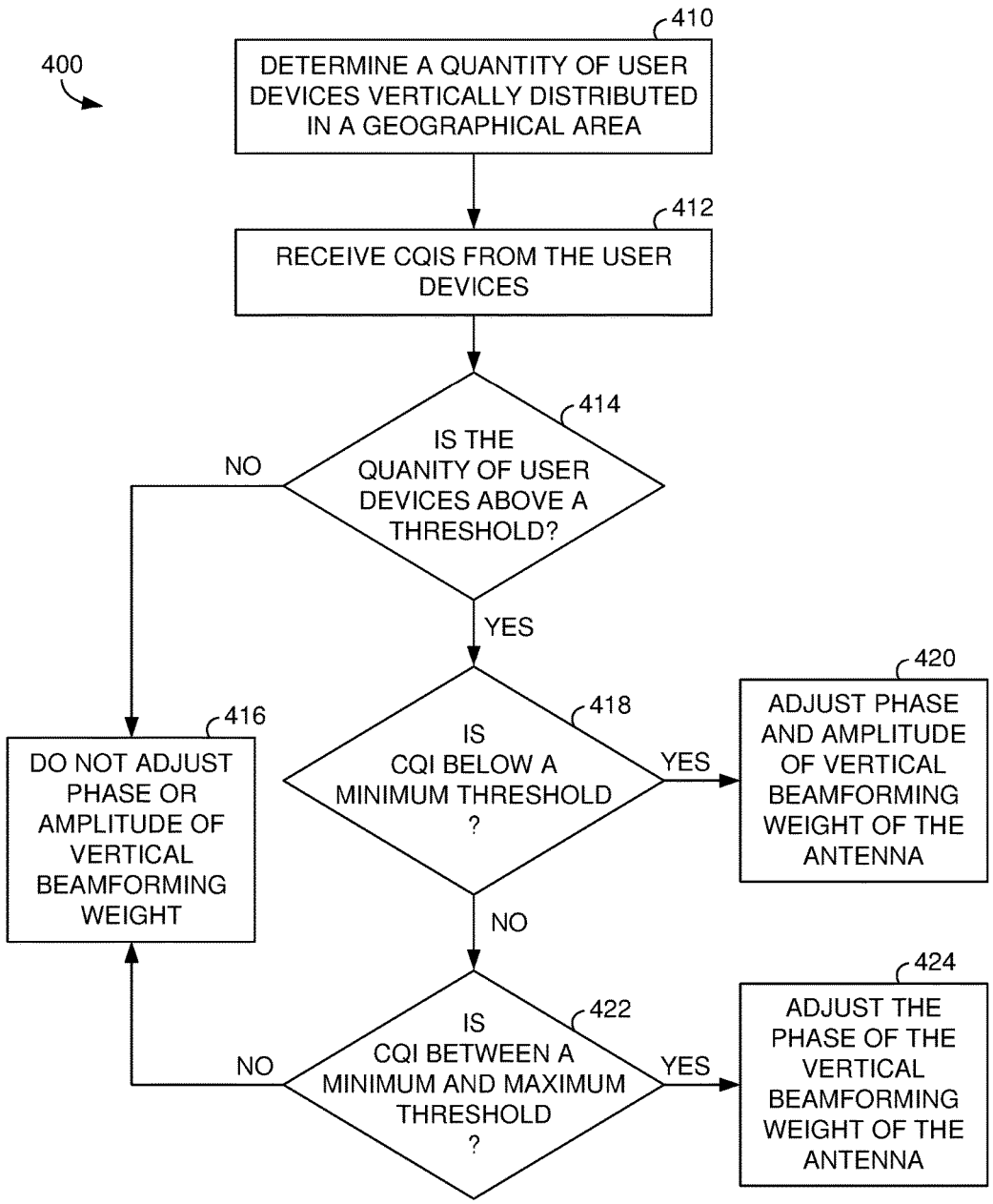
FIG. 4 depicts a flow diagram of an exemplary method for dynamically adjusting vertical beamforming weights to influence a width of a beam emitted from an antenna, in accordance with implementations of the present disclosure.

FIG. 4. depicts a flow diagram of an exemplary method 400 for dynamically adjusting vertical beamforming weights to influence a vertical beam width of antenna, in accordance with implementations of the present disclosure. Initially at block 410, a quantity of user devices that are vertically distributed in a geographical area is determined. In some embodiments, the geographical area may be a structure, such as a building that had multiple levels or floors. User devices may be vertically separated, such as some on lower levels and some on higher levels. When beamforming is utilized by a cell site, users on either the upper levels or lower levels may not be included in the coverage area of the cell site because of the vertical difference in location. As such, vertical beamforming may be utilized to solve this problem.

At block 412, CQIs from the user devices are received. In some instances, CQIs are received from one or more of the user devices in the structure or geographical area. In many instances, CQIs may be received from many or most of the user devices. As mentioned above, CQI is an indicator as to how good or bad the channel quality is from a cell site to a user device. This may be determined by user devices, and thus is sent from the user devices to the cell site 214. Once the CQIs are received, some type of processing may be done to find an average, mean, median, etc., of the received CQIs. Alternatively, all CQIs received are analyzed separately, and if one or more CQIs indicate a poor channel quality, action may be taken, as described below.

At block 414, it is determined whether the quantity of user devices is above a threshold value. For instance, if the quantity of user devices is small and below a predefined threshold, it may not make sense to modify the beam from the antennas at the cell site. However, if the quantity is above a predefined threshold, it may make sense to modify the beam so that more users are affected by the change in the width of the beam, done by modifying the vertical beamforming weight. If the quantity of users is not above a threshold number, neither the phase nor the amplitude of the vertical beamforming weight is adjusted, and as such the beamforming weight is kept constant, shown at block 416. However, if the quantity of user devices is above a threshold number, it is next determined whether the CQI(s) is below a minimum threshold at block 418. This threshold may be predetermined, and may be set by the service provider or antenna manufacturer. If the CQI(s) is below a minimum threshold, the phase and amplitude of the vertical beamforming weight of the antenna is adjusted at block 420, which effectively would increase the width of the beam. If, however, the CQI(s) is not below a minimum threshold, it is determined whether the CQI is between a minimum and maximum threshold, shown at block 422. If not (e.g., channel quality is high such that the beam width does not need to be adjusted), neither the phase nor amplitude of the vertical beamforming weight is adjusted, at block 416. If, however, the CQI is between a minimum and maximum threshold, the phase (but not the amplitude) of the vertical beamforming weight of the antenna is adjusted at block 424.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for dynamically adjusting vertical beamforming weights to influence a width of a beam emitted from an antenna, the method comprising:
   determining a quantity of user devices present in a particular geographic area;
   receiving channel quality indicators (CQIs) from one or more of the user devices;
   determining that,
   1) the quantity of the user devices is above a maximum threshold of user devices, and
   2) the CQIs indicate that channel quality is below a minimum threshold;
   based on the CQIs indicating that the channel quality is below the minimum threshold, determining an amplitude value and a phase value for adjusting the width of the vertical beam of the antenna; and
   adjusting amplitude and phase components of a vertical beamforming weight based on the determined amplitude value and phase value.

2. The method of claim 1, wherein the user devices have a line of sight with the antenna.

3. The method of claim 1, wherein the CQIs from the one or more of the user devices are received via a base station associated with the antenna.

4. The method of claim 3, wherein the CQIs are based, in part, on a signal-to-noise ratio between the one or more of the user devices and the base station.

5. The method of claim 1, wherein when the CQIs indicate that the channel quality is below the minimum threshold, there is one of more of poor RF conditions, low throughput, or high signal-to-interference-plus-noise ratio (SINR).

6. The method of claim 1, wherein at least a portion of the user devices are vertically distributed from the others of the user devices.

7. The method of claim 6, wherein the user devices are located in a structure having two or more floors.

8. The method of claim 1, wherein adjusting the amplitude and phase components of the vertical beamforming weight causes the width of the vertical beam to increase.

9. The method of claim 1, wherein determining the amplitude value and the phase value comprises accessing a database that stores amplitude values and phase values correlated to CQI values.

10. The method of claim 1, wherein the adjustment of the phase and the amplitude of the vertical beamforming weight is directly correlated to the received CQIs.

11. One or more non-transitory computer-readable media having computer-executable instructions embodied thereon that, when executed, perform a method for dynamically adjusting vertical beamforming weights to influence a width of a beam emitted from an antenna, the method comprising:
    identifying a quantity of user devices present in a particular geographic area, wherein at least a portion of the user devices are vertically distributed from others of the user devices;
    receiving channel quality indicators (CQIs) from one or more of the user devices;
    determining that,
    1) the quantity of the user devices is above a maximum threshold of user devices, and
    2) the CQIs indicate that channel quality is above a minimum threshold and below a maximum threshold; and
    adjusting a phase component of a vertical beamforming weight based on a determined phase value.

12. The media of claim 11, the method further comprising not adjusting the amplitude component of the vertical beamforming weight.

13. The media of claim 11, wherein the user devices have a line of sight to the antenna.

14. The media of claim 11, the method further comprising based on the CQIs indicating that the channel quality is above the minimum threshold and below the maximum threshold, determining a phase value used to adjust the width of the vertical beam emitted from the antenna.

15. The media of claim 14, wherein determining the phase value further comprises accessing a database that stores phase values correlated to CQI values.

16. A dynamic vertical beamforming system for dynamically adjusting vertical beamforming weights to influence a width of a beam emitted from an antenna, the dynamic vertical beamforming system comprising:

a processor; and one or more computer storage hardware devices storing computer-usable instructions that, when used by the processor, cause the processor to:

determine that a quantity of user devices is above a threshold of user devices, determine, based on quality information sent from the user devices, current radio frequency (RF) conditions between the antenna and the user devices, if the current RF conditions are below a minimum threshold, adjusting phase and amplitude components of the vertical beamforming weight, and if the current RF conditions are above the minimum threshold and below a maximum threshold, adjusting the phase component of the vertical beamforming weight.

17. The dynamic vertical beamforming system of claim 16, wherein the user devices are in a particular geographic area.

18. The dynamic vertical beamforming system of claim 16, the processor further caused to:

if the current RF conditions are above the minimum threshold and below the maximum threshold, not adjusting the amplitude component of the vertical beamforming weight.

19. The dynamic vertical beamforming system of claim 16, wherein the RF conditions provide an indication of SINR, throughput, and efficiency.

20. The dynamic vertical beamforming system of claim 16, wherein the width of the vertical beam emitted from the antenna is widened when the current RF conditions are below the minimum threshold.

* * * * *